United States Patent [19]
Lauretta et al.

[11] Patent Number: 5,207,772
[45] Date of Patent: May 4, 1993

[54] LITER BOX LINER AND FILTRATION SYSTEM AND METHOD

[76] Inventors: John J. Lauretta; Romana A. Lauretta, both of 4398 Prasse Rd., South Euclid, Ohio 44121

[21] Appl. No.: 855,303

[22] Filed: Mar. 23, 1992

[51] Int. Cl.$^5$ .............................................. A01K 29/00
[52] U.S. Cl. ................................................. 119/167
[58] Field of Search ................ 119/166, 167, 169, 170

[56] References Cited

U.S. PATENT DOCUMENTS

| | | | |
|---|---|---|---|
| 3,233,588 | 2/1966 | Thomas | 119/1 |
| 3,310,031 | 3/1967 | Lowe, Jr. | 119/1 |
| 3,796,188 | 3/1974 | Bradstreet | 119/1 |
| 3,809,013 | 5/1974 | Rigney et al. | 119/167 |
| 3,826,229 | 7/1974 | Classe et al. | 119/17 |
| 3,978,818 | 9/1976 | Heldenbrand | 119/1 |
| 4,030,449 | 6/1977 | Ruddick et al. | 119/1 |
| 4,190,525 | 2/1980 | Menzel | 209/235 |
| 4,308,825 | 1/1982 | Stepanian | 119/1 |
| 4,312,295 | 1/1982 | Harrington | 119/167 |
| 4,359,966 | 11/1982 | Casino | 119/1 |
| 4,407,231 | 10/1983 | Calborn et al. | 119/1 |
| 4,534,315 | 8/1985 | Sweeney | 119/1 |
| 4,548,160 | 10/1985 | Freitelson | 119/1 |
| 4,784,082 | 11/1988 | Wolfe | 119/167 |
| 4,870,924 | 10/1989 | Wolfe | 119/167 |
| 5,062,392 | 11/1991 | Lavash | 119/169 X |

FOREIGN PATENT DOCUMENTS 8903174  4/1989  World Int. Prop. O. .......... 119/170

*Primary Examiner*—Gene Mancene
*Assistant Examiner*—Thomas Price
*Attorney, Agent, or Firm*—Renner, Otto, Boisselle & Sklar

[57] ABSTRACT

A litter box liner system and method for use with an animal waste litter box and litter material has separably attached layers of perforated filters which line the bottom of the box over which litter material is spread. Periodic removal of each filter recirculates the litter material from the bottom up and catches solid waste for convenient and sanitary disposal. An unperforated bottom layer lines and protects the interior of the litter box from contact with the litter material and captures all of the litter material for convenient and sanitary disposal. The separably attached layers of perforated filters may be individual sheets or incorporated into individual interfitting filter liner bags which fit over the litter box and contain solid waste upon removal. Alternatively, the top facing surface of a single liner bag may include layers of separably attached filters.

11 Claims, 3 Drawing Sheets

LITER BOX LINER AND FILTRATION SYSTEM AND METHOD

FIELD OF THE INVENTION

The present invention relates to a litter box liner and filtration system and method for use in litter boxes with litter material for receiving waste of domestic animals.

BACKGROUND OF THE INVENTION

Litter boxes filled with litter material are commonly used for domestic animals such as cats and dogs as convenient means of containment for urine and excrement. Such boxes are generally rectangular in shape having the dimensions of, for example, approximately 50 centimeters in length by 36 centimeters in width, with vertical side walls of, for example, approximately 10 centimeters in height. Such boxes are filled to a depth of approximately 5 to 10 centimeters with granular litter material which absorbs urine and deodorizes. The litter material is customarily left in the litter box for a period of 7 to 10 days after which it is disposed of and replaced. During such period, however, solid waste must be separated from the litter material for disposal. The removal of solid waste from the litter material requires the use of a scooping tool or glove and is generally a messy and unsanitary process. Aversion to the undesirable task of removing solid waste from the litter box often prompts disposal of all of the litter material prior to expiration of its useful life. As urine is absorbed by the litter material, dampened spots develop clumps in uncirculated litter which, if not dispersed or removed, concentrate odor production and shorten the useful life of the litter material. Also, direct contact of the litter material and animal waste with the interior of the litter box results in soiling and contamination of the box, necessitating cleaning of the box with each changing of the litter material.

SUMMARY OF THE INVENTION

To overcome these and other disadvantages associated with the routine maintenance of sanitary conditions in litter boxes, the present invention provides a litter box liner and filtration system which facilitates easy, efficient and sanitary removal and disposal of animal waste deposited in the box and further provides means to filter the litter material to allow it to remain in the box for its maximum useful life. One embodiment of the invention provides layers of separably attached perforated filter liners which cover the interior of a litter box into which litter material is placed. The filter liners may extend up and over the side walls of the litter box to provide complete containment of the litter material and protection of the interior of the box. As each perforated filter liner is separately detached from the layer and lifted from the box, all of the litter material is circulated from the bottom up by sifting filtration through the perforations in the filter liner back into the box. The filter liner captures all solid waste, and litter material which has clumped together by moisture, and neatly contains it for disposal. An unperforated liner at the bottom of the layer is used to capture all of the litter material for disposal.

In another embodiment of the invention, layers of inter-fitting filter liner bags, open at one end, are provided. A litter box is inserted into the innermost bag. The top facing surface of each bag has a perforated filter pattern which fits down in the bottom surface of the box. Litter material is placed over the top facing filter portion of the bags in the interior of the litter box. To filter the litter material and remove solid waste, each bag may be peeled separately from about the box, turned inside out over the box to filter the litter material through the perforated side of the bag and capture solid waste for disposal. The innermost bag is without perforations and is used to capture all of the litter material for disposal.

In still another embodiment of the invention, there is provided a single filter liner bag without perforations having an open end into which a litter box is inserted with the top facing side of the bag fitting down in the bottom of the box. The top facing side of the bag includes multiple layers of perforated filters separably attached to the bag. Litter material is spread over the layers of filters. Each filter may be removed from the top of the bag and lifted above the box to filter the litter material from the bottom up and back into the litter box while capturing solid waste for disposal. Once the last filter is removed, the bag is peeled off of the box by turning it inside out neatly to contain all of the litter material and any remaining solid waste for disposal.

To the accomplishment of the foregoing and related ends, the invention comprises the features hereinafter fully described and particularly pointed out in the claims, the following description and annexed drawings setting forth in detail certain illustrative embodiments of the invention, these being indicative, however, of but some of the various ways in which the principles of the invention may be employed.

DETAILED DESCRIPTION OF THE PREFERRED EMBODIMENTS

Figure 1:
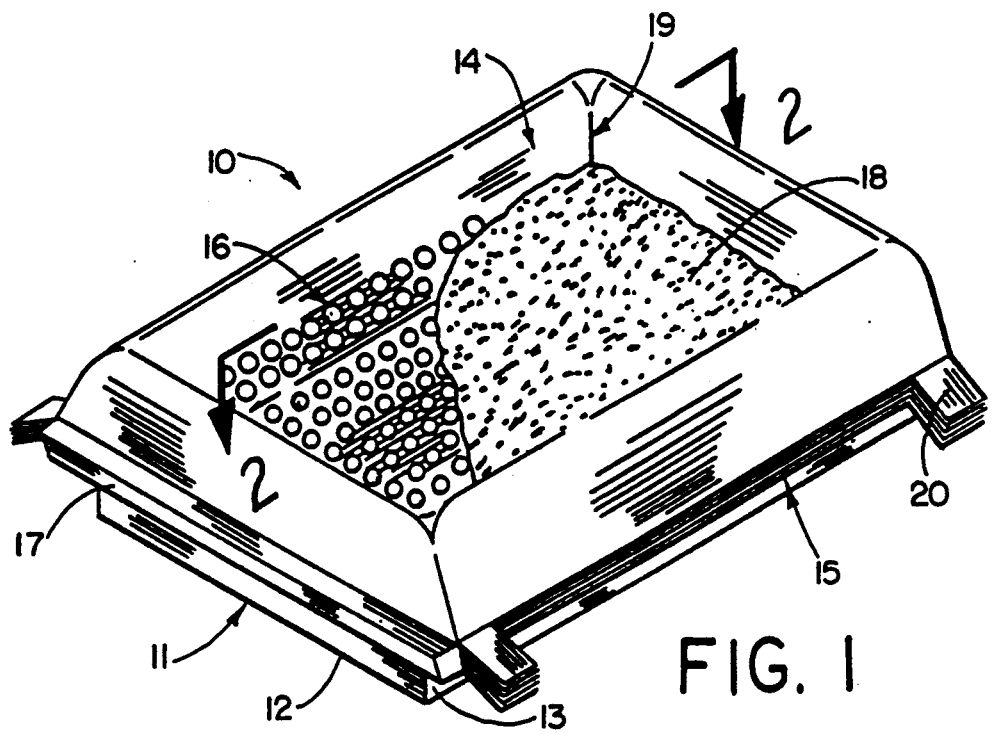
FIG. 1 is a perspective view of one embodiment of the present invention having layers of perforated filter liners positioned within a litter.
Figure 2:
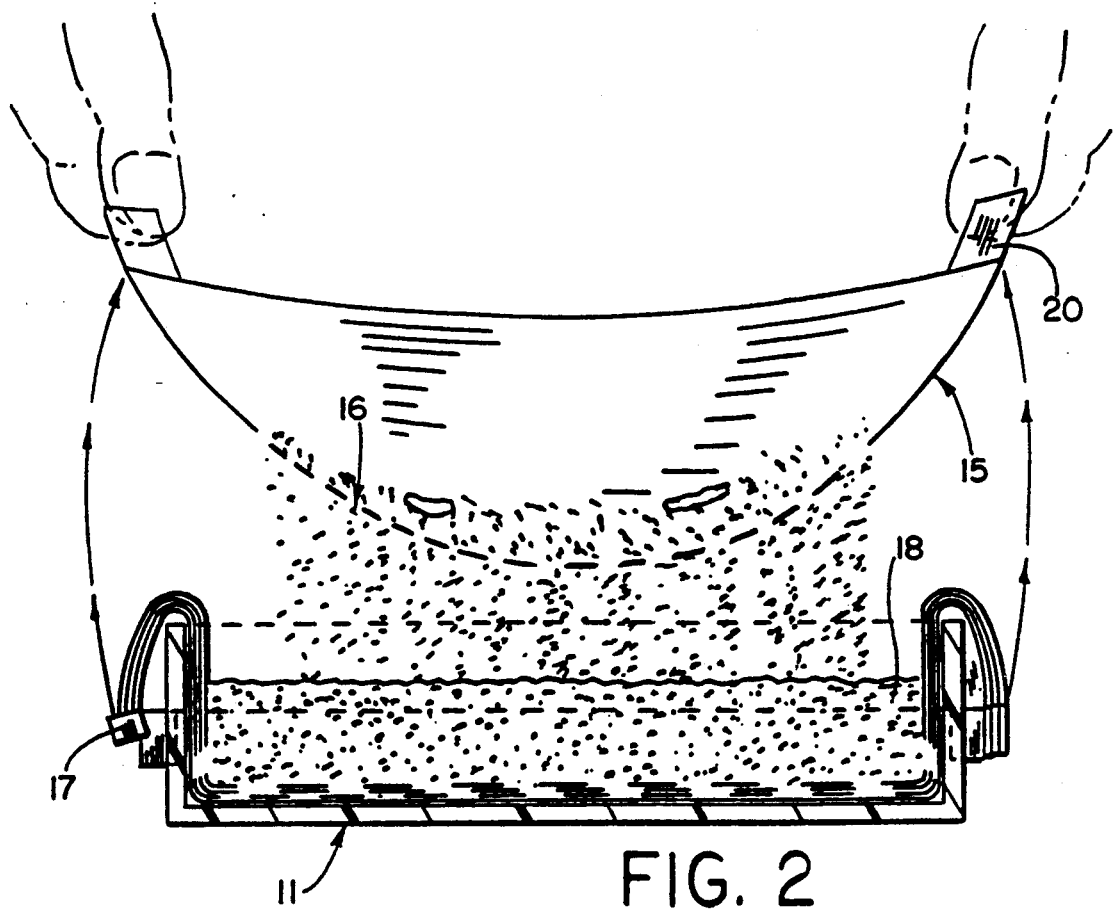
FIG. 2 is a view of a cross-section taken generally along the direction of arrows 2—2 in FIG. 1.

Referring now in detail to the accompanying drawings, FIGS. 1 and 2 illustrate one embodiment of the litter box liner and filtration system, indicated generally at 10. A rectangular litter box 11 has a bottom 12 and side walls 13 which form the interior 14 of the box. The box is open to the top and has the approximate dimensions of, for example, 50 centimeters in length 36 centimeters in width, and side walls of an approximate height of 10 centimeters. A stack or layer of sheet-like filter liners 15 are positioned in the interior 14 of box 11 completely to cover the interior surface of bottom 12 and side walls 13. As shown, the filter liners may wrap over the top of the side walls to fully protect the box. Each individual filter liner 15 is generally rectangular in shape, with width and length dimensions slightly greater than those of the box, and may be folded or pleated as shown to conform to the interior of the box. Each filter has a pattern of perforations or filtration holes 16 of sufficient size and relative spacing to allow filtration of litter material therethrough, but able to retain solid waste such as feces or litter material which clumps together when dampened. The shape of the holes 16 may be, for example, circular with a diameter of, for example, 5 millimeters to 10 millimeters, or of any shape which provides openings of comparable size to perform the desired function. The holes may be spaced apart a distance of, for example, 5 to 15 millimeters. Each filter liner 15 is attached to every other filter liner along a separable binding 17 which serves to keep each filter liner of the layer in alignment as they are installed in the box. The binding 17 may include frangible perforations at the point of attachment of each filter liner. Alternatively, adhesive may be used to accomplish common separable attachment between each filter liner. Litter material 18 is dispersed about the bottom 12 of the box 11 on top of filter liners 15. Each filter liner 15 may also include pleats or folds 19 which correspond to the internal dimensions of the interior 14 of box 11 to allow each filter liner to lie substantially flat in the bottom of the box. Gripping tabs 20 may be provided at the perimeter of each filter liner 15 to facilitate easy and sanitary handling of each filter liner during the removal, sifting and disposal process.

FIG. 2 is a cross-section taken generally along the direction of arrows 2—2 in FIG. 1, illustrating the layered configuration of filter liners 15 as positioned within box 11, with litter material 18 spread over the top of the filter liners. As shown, the top filter liner 15 of the layer is detached from frangible binding 17 and lifted vertically by tabs 20 over box 11 to sift and circulate litter material 18 through holes 16 back into the box and to retain any solid waste or clumped litter material. As shown, the bottom filter liner of the layer is without perforations, and is thereby used to remove all of the litter material 18 from the box.

Figure 3:
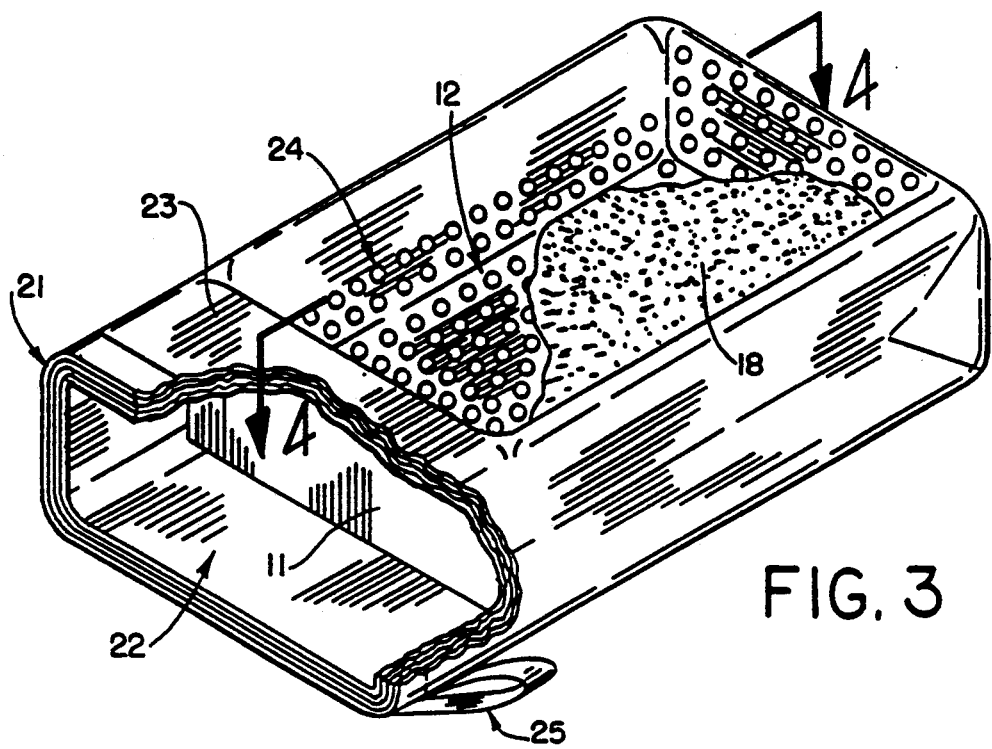
FIG. 3 is a perspective view of one embodiment of the present invention having layers of inter-fitting filter liner bags positioned about a litter box.
Figure 4:
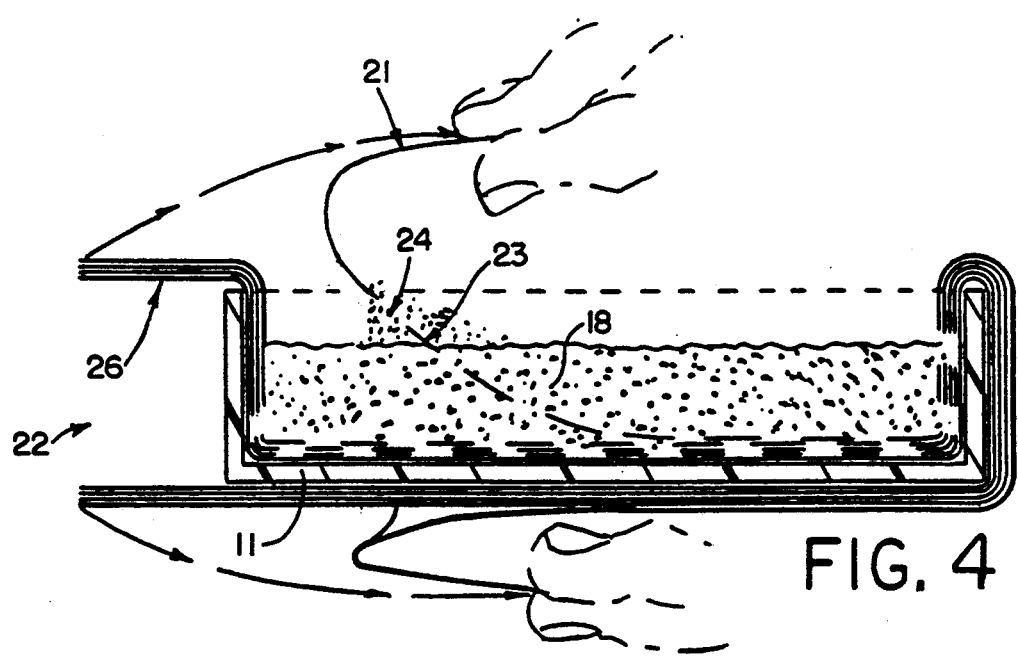
FIG. 4 is a view of a cross-section taken generally along the direction of arrows 4—4 in FIG. 3.

Referring now to FIGS. 3 and 4, there is illustrated another embodiment of the present invention wherein layers of inter-fitting filter liner bags 21 are positioned about and in box 11. As shown, each filter liner bag 21 is of generally rectangular shape, having an open end 22 into which a litter box 11 is inserted. The top surface 23 of each bag fits down in the bottom 12 of the box 11 and is provided with a pattern of filtration holes 24 of sufficient size and relative spacing to allow efficient filtration of litter material 18. Litter material 18 is spread over the top surface 23 of the filter liner bags. As shown in FIG. 4, when the first bag 21 of a layer is to be removed, it is peeled from the open end 22 down the length of the box and turned inside out with the top surface 23 remaining in position over the open top of the box. The litter material 18 is filtered through holes 24 back into the box and the bag 21 retains solid waste for convenient and sanitary disposal. As shown in FIG. 3, each bag 21 may additionally include an integral drawstring 25 about open end 22 for drawing and sealing the bag closed for convenient and sanitary disposal. As shown in FIG. 4, the innermost bag 26 of the layer is without filtration holes to enable it to capture all of the litter material 18 for disposal upon removal from the box in a similar manner. Also, to maintain organization of the inter-fitting layer, each bag may be attached to every other bag by, for example, adhesive near open end 22 or, alternatively, by common attachment at the opposite closed ends of the bags.

Figure 5:
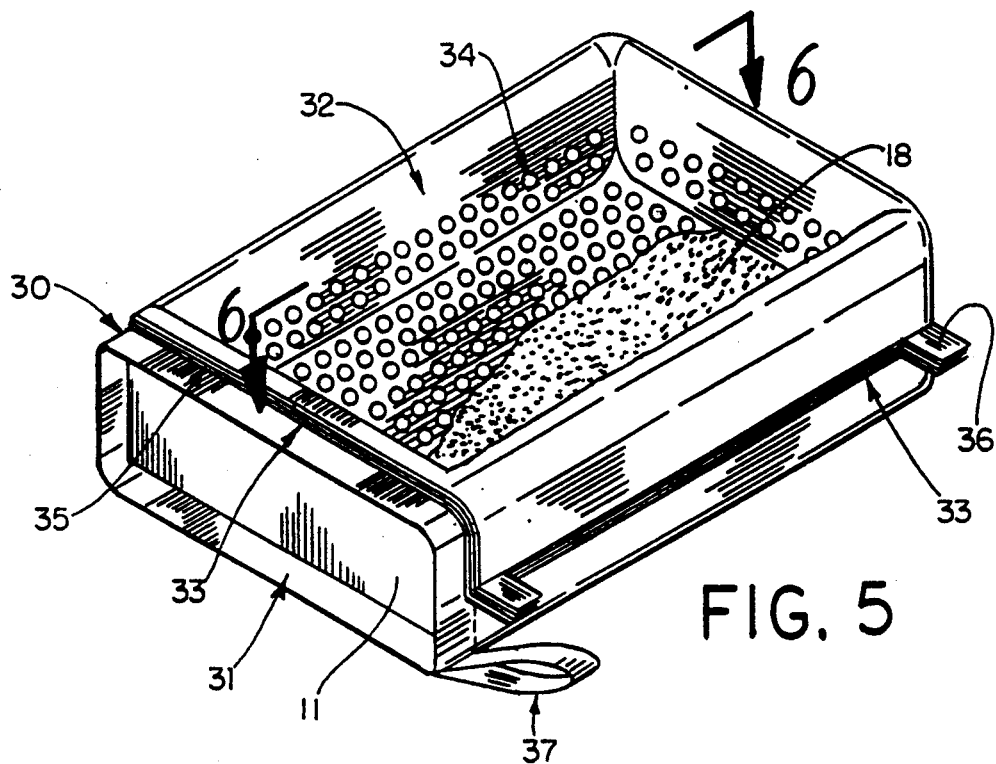
FIG. 5 is a perspective view of one embodiment of the present invention having a liner bag with multiple layers of removable filters attached thereto.
Figure 6:
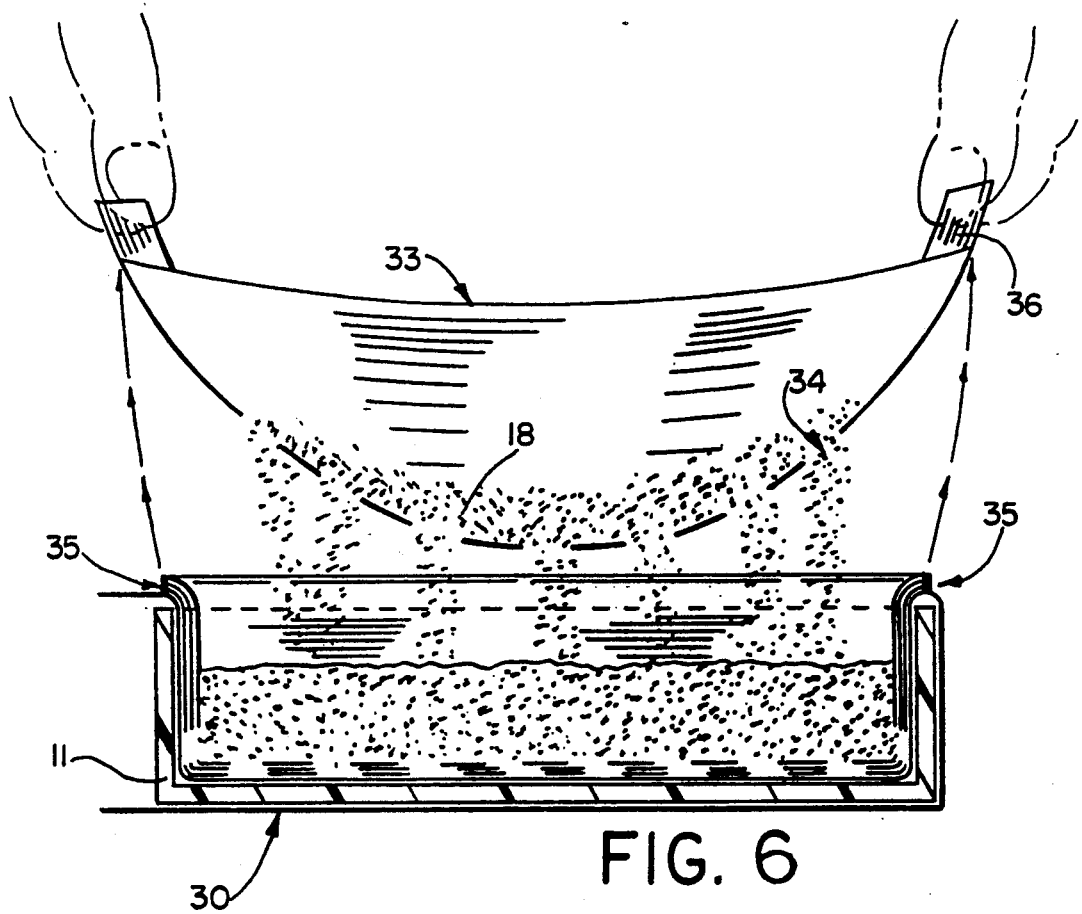
FIG. 6 is a view of a cross-section taken generally along the direction of arrows 6—6 in FIG. 5.

Referring now to FIGS. 5 and 6, there is illustrated another embodiment of the invention wherein a single liner bag 30 is provided into which litter box 11 is inserted through open end 31. The top surface 32 of the liner bag 30 includes a layer of multiple separably attached filters 33 which may overlap the side walls 13 of the box 11 as shown. Each filter 33 is provided with a pattern of perforations 34 of appropriate size and relative spacing to allow filtration of litter material 18 and therethrough to capture solid waste for disposal. Each filter 33 is separably attached to the bag liner bag 30 along a frangible seam 35 about the periphery of the top surface 32 of liner bag 30. The frangible seam 35 may be, for example, perforated or adhesive attachment. Alternatively, adhesive may be used to removably attach each filter 33 to every other filter and to liner bag 30. Litter material 18 is poured over the top surface 32 of the bag and filters 33 which are positioned to lie substantially flat in the bottom of box 11. Gripping tabs 36 may be provided along the edge of filters 33 to facilitate removal of each filter 33 from the liner bag 30.

As shown in FIG. 6, each filter 33 may be detached from the liner bag 30 and lifted directly above the box to filter litter material 18 back into the box and capture solid waste for disposal. Once the last filter 33 of the layer is removed, only the liner bag 30 remains underneath the litter material 18. In a similar manner as described in connection with FIGS. 3 and 4 regarding the removal of filter bags 20, the liner bag 30 is removed from the box by peeling it away from open end 31 and, turning it inside out to capture all of the litter material for disposal. As shown in FIG. 5, the liner bag 30 may also be provided with a drawstring 37 for easy and convenient sealing of the bag upon disposal.

Although the invention has been shown and described with respect to certain preferred embodiments, it is obvious that equivalent alterations and modifications of such embodiments will occur to others skilled in the art upon the reading and understanding of this specification. The present invention includes all such equivalent alterations and modifications and is limited only by the scope of the following claims.

We claim:

1. A filter liner system for use with a litter box having an open top and containing litter material for receiving animal waste comprising,
    a plurality of inter-fitting filter liner bags having an open end and sufficient volume to insert said box into said bags through said open end so that said box is completely enclosed by said bags,
    a top surface of each of said bags fitting in the bottom of said box over which litter material is placed,
    a bottom solid surface of each of said bags positioned underneath said box,
    said top surface of each of said bags further comprising a plurality of perforations, said perforations being of sufficient size and relative placement to allow filtration of litter material therethrough and retention of solid animal waste.

2. The filter liner system of claim 1 wherein each of said bags further includes a drawstring about an open end of each bag for drawing and sealing each bag closed.

3. The filter liner system of claim 1 wherein the top surface of the inner most bag is without said perforations.

4. The filter liner system of claim 1 wherein said bags are made of moisture resistant paper-based material.

5. The filter liner system of claim 1 wherein said bags are made of plastic.

6. A filter liner system for use with a litter box having an open top and containing litter material for receiving animal waste comprising,
- a bag having an open end and sufficient volume to fit said box within said bag through said open end so that a top surface of said bag lies substantially flat in the bottom of said box and over which litter material is spread, and a bottom surface of said bag is underneath said box,
- the top surface of said bag further comprising a plurality of removably attached filters,
- each filter comprising a plurality of perforations of adequate size and relative placement to allow filtering of litter material therethrough and retention of solid animal waste,
- said filters being commonly removably attached to the top surface of said bag.

7. The filter liner system of claim 6 wherein said removable filters further comprise gripping means.

8. The filter liner system of claim 6 wherein said bag and said filters are made of moisture resistant paper-based material.

9. The filter liner system of claim 6 wherein said bag and said filters are made of plastic.

10. The filter liner system of claim 6 wherein said bag further includes a drawstring about said open end for drawing and sealing the bag closed.

11. A filter liner system for use with a litter box having an open top and containing litter material for receiving animal waste comprising,
- a plurality of layered removably attached sheet-like litter box filter liners of sufficient size to cover the interior of said box,
- each filter liner having a plurality of perforations,
- said perforations being of sufficient size and relative spacing to allow filtration of said litter material through said filter liner and retention of solid animal waste,
- and at least one filter liner without said perforations at the bottom of said layered filter liners,
- each of said layered filter liners removably attached to every other filter liner by adhesive,
- each of said filter liners further including gripping means, and
- each of said filter liners further having pleats which conform to the interior of said litter box.

* * * * *